(12) United States Patent
Sabri et al.

(10) Patent No.: US 7,066,686 B2
(45) Date of Patent: Jun. 27, 2006

(54) AUTOMATIC CONTROL METHODS FOR POSITIONING THE LOWER END OF A FILIFORM STRUCTURE, NOTABLY AN OIL PIPE, AT SEA

(75) Inventors: Rida Sabri, Malakof (FR); Claude Putot, L'Etang la Ville (FR); Francis Biolley, Chatou (FR); Cédric Le Cunff, Paris (FR); Yann Creff, Les Cotes d'Arey (FR); Jean Levine, Paris (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 133 days.

(21) Appl. No.: 10/864,640

(22) Filed: Jun. 10, 2004

(65) Prior Publication Data

US 2005/0265789 A1 Dec. 1, 2005

(30) Foreign Application Priority Data

Jun. 11, 2003 (FR) .................................. 03 06975

(51) Int. Cl.
*F16L 1/14* (2006.01)

(52) U.S. Cl. ...................... 405/158; 405/166; 405/172; 405/224.2; 166/341; 166/345; 166/350; 166/359; 166/367

(58) Field of Classification Search ................. 405/158, 405/166, 172, 160, 171, 154.1, 224.2
See application file for complete search history.

(56) References Cited

U.S. PATENT DOCUMENTS

| 3,731,263 | A | | 5/1973 | Daniels et al. .............. 340/3 R |
|---|---|---|---|---|
| 4,351,027 | A | * | 9/1982 | Gay et al. ................... 701/116 |
| 4,624,318 | A | * | 11/1986 | Aagaard ..................... 405/172 |
| 4,708,525 | A | * | 11/1987 | Beynet et al. ........... 405/224.2 |
| 5,594,309 | A | | 1/1997 | McConnell et al. ... 318/568.22 |
| 5,978,739 | A | * | 11/1999 | Stockton ........................ 702/6 |
| 6,278,937 | B1 | | 8/2001 | Ishida et al. ................ 701/207 |
| 6,461,083 | B1 | * | 10/2002 | Pionetti et al. .......... 405/224.2 |
| 6,659,690 | B1 | * | 12/2003 | Abadi ...................... 405/224.2 |

OTHER PUBLICATIONS

Preliminary Search Report with English language translation.

* cited by examiner

*Primary Examiner*—Frederick L. Lagman
(74) *Attorney, Agent, or Firm*—Antonelli, Terry, Stout and Kraus, LLP.

(57) ABSTRACT

Method intended for automatic control of an underwater pipe for connecting the lower end of the pipe to a wellhead, wherein the following stages are carried out:
  Stage 1: determining a mathematical model expressing the position of the lower end of the pipe as a function of the position of the upper end of the pipe,
  Stage 2: determining a reference path leading to the wellhead,
  Stage 3: from the mathematical model determined in stage 1, determining control laws allowing to control the path of the lower end of the pipe,
  Stage 4: applying determined motions to the upper end of the pipe so that the position of the lower end is as close as possible to the reference path determined in stage 2.

12 Claims, 1 Drawing Sheet

AUTOMATIC CONTROL METHODS FOR POSITIONING THE LOWER END OF A FILIFORM STRUCTURE, NOTABLY AN OIL PIPE, AT SEA

FIELD OF THE INVENTION

The present invention relates to a method for laying an oil pipe underwater through active control.

BACKGROUND OF THE INVENTION

Development of offshore oil fields requires pipes commonly referred to as risers or flowlines. A riser allows a wellhead located at the sea bottom to be connected to a platform located at the surface. A flowline is an underwater pipe lying on the sea bottom and connecting two wellheads for example. The pipes can be flexible or rigid.

During pipe installation, a floating vessel brings to the oil field site the pipe that can be wound on reels or stored in sections whose length ranges between about 20 and 30 meters. The pipe is progressively arranged rectilinear until the lower end reaches the subsea wellhead. Unwinding of the pipe can be more or less fast depending on whether flexible pipes, unwound rigid pipes, or welded, flanged or screwed rigid sections are used.

According to standard practice, the end of the pipe is filmed as it gets close to the wellhead. An operator can thus know the relative position of the end of the pipe in relation to the wellhead. Positioning of the lower end of the pipe is conditioned by two motion types of the floating vessel. On the one hand, the vertical and horizontal motion, at the frequency of the wave motion, considered as an elliptical motion if the wave motion is assumed to be sinusoidal. On the other hand, a low-frequency drift motion, of the order of some minutes. When the end of the pipe is vertical to the wellhead, the operator orders to apply a descending vertical motion to the pipe so that the end of the pipe comes smoothly into contact with the wellhead. Then, the end of the pipe is connected to the wellhead.

The wellhead connection operations are random, delicate and depend on the operating staff's skill. The floating vessel undergoing the wave motion and the low-frequency drift, the motions of the lower end of the pipe are not controlled. It is necessary to wait for the appropriate time where the end of the pipe is vertical to the wellhead to be able to act rapidly and to establish the connection.

Furthermore, this method cannot be implemented in bad weather. Under the effect of the wave motion and of the wind, the floating vessel undergoes motions, notably vertical motions, of great amplitude transmitted to the lower end of the pipe. These motions make connection to the wellhead difficult or impossible.

SUMMARY OF THE INVENTION

The present invention provides a method allowing automatic and reliable connection of a pipe to a wellhead even when the wellhead undergoes considerable motions due to the wave motion and the wind.

In general terms, the method according to the invention can be applied to any type of filiform structure suspended in water, the lower end of the structure being intended to reach a target. A filiform structure can be defined by a structure having a great length in relation to the dimensions of the cross-section thereof. For example, the length of a filiform structure is at least ten times as great as the greatest dimension of its cross-section.

In the petroleum industry, the invention applies to flowline, production riser or drilling riser type pipes that have to be connected to a wellhead, or to umbilicals or cables that have to be connected or fastened to a baseplate resting on the sea bottom.

The invention also applies to laying of a load hanging from a cable, the load having to be positioned at a precise point.

In general terms, the invention relates to an automatic control method for positioning the lower end of an underwater filiform structure in relation to a target located in the water, wherein the following stages are carried out:
a) holding up the upper end of the filiform structure by means of a floating vessel, the lower end of the filiform structure being free,
b) determining a mathematical model expressing the position of the lower end as a function of the position of the upper end, the mathematical model being determined from characteristics intrinsic to the filiform structure using a beam model translating the dynamic behaviour of the filiform structure and using a modal decomposition method,
c) determining a reference path for the lower end, which leads to the target,
d) from the mathematical model determined in stage b), determining control laws allowing displacement of the lower end of the filiform structure,
e) applying motions to the upper end so that the position of the lower end follows as closely as possible the reference path determined in stage c), said motions being determined using the control laws determined in stage d), by taking account of the reference path determined in stage c) and by taking account of the positions of the lower and upper ends of the filiform structure.

A mathematical model can be determined by means of the following operations:
operation 1: expressing the displacement dynamics of the filiform structure by partial differential equations,
operation 2: carrying out spatial discretization on the partial differential equations obtained in operation 1 to obtain a matrix equation translating the displacement vector dynamics,
operation 3: from the intrinsic characteristics of the filiform structure, determining the vertical and lateral natural modes associated with the filiform structure,
operation 4: carrying out decomposition of the displacement vector obtained in operation 2 using the natural modes determined in operation 3 in an orthogonal modal base and in the frequency domain to obtain a displacement vector expressed in the frequency domain as a function of the modal base and of coefficients,
operation 5: linearizing the drag force by introducing a variable which corresponds to a norm of the relative velocity of the pipe in relation to the water,
operation 6: determining the coefficients of the displacement vector obtained in operation 4 using the matrix equation obtained in operation 2 and the orthogonality of said base,
operation 7: selecting a determined and limited number of natural modes to define the displacement vector,
operation 8: extracting the component of the displacement vector obtained in operation 7 corresponding to the node located at the lower end of the filiform structure to obtain an equation relating the position of the lower end to the position of the upper end in the frequency domain, operation 9: converting the equation obtained in operation 8 to a time equation, operation 10: determining said variable by identification.

The reference path can be expressed by a polynomial function.

The reference path can be determined so that the lower end of the filiform structure reaches the target with a zero velocity.

In stage d), the control laws can be determined from the flat system theory.

In stage d), the control laws can be determined using PID type controllers.

In stage e), the position of the lower end of the filiform structure can be determined by visual display of the lower end.

In stage e), the position of the upper end of the filiform structure can be determined by measuring the displacement of the floating vessel.

It is possible to measure the motion undergone by the upper end of the filiform structure for a period preceding stage e) and in stage e), and the motion of the upper end of the pipe can be assumed to be identical to the previously measured motion.

According to the invention, the filiform structure can be a flowline, production riser or drilling riser type pipe, the target being a subsea wellhead. The filiform structure can also be an umbilical or a cable, in which case the target is a baseplate resting on the sea bottom. The filiform structure can also be a cable whose lower end supports a load.

One advantage of the method according to the invention is that it can be used at great depths, for example for a target located at depths greater than 1000 meters.

BRIEF DESCRIPTION OF THE FIGURES

Other features and advantages of the invention will be clear from reading the description hereafter, with reference to the accompanying drawings wherein.

DETAILED DESCRIPTION

Figure 1:
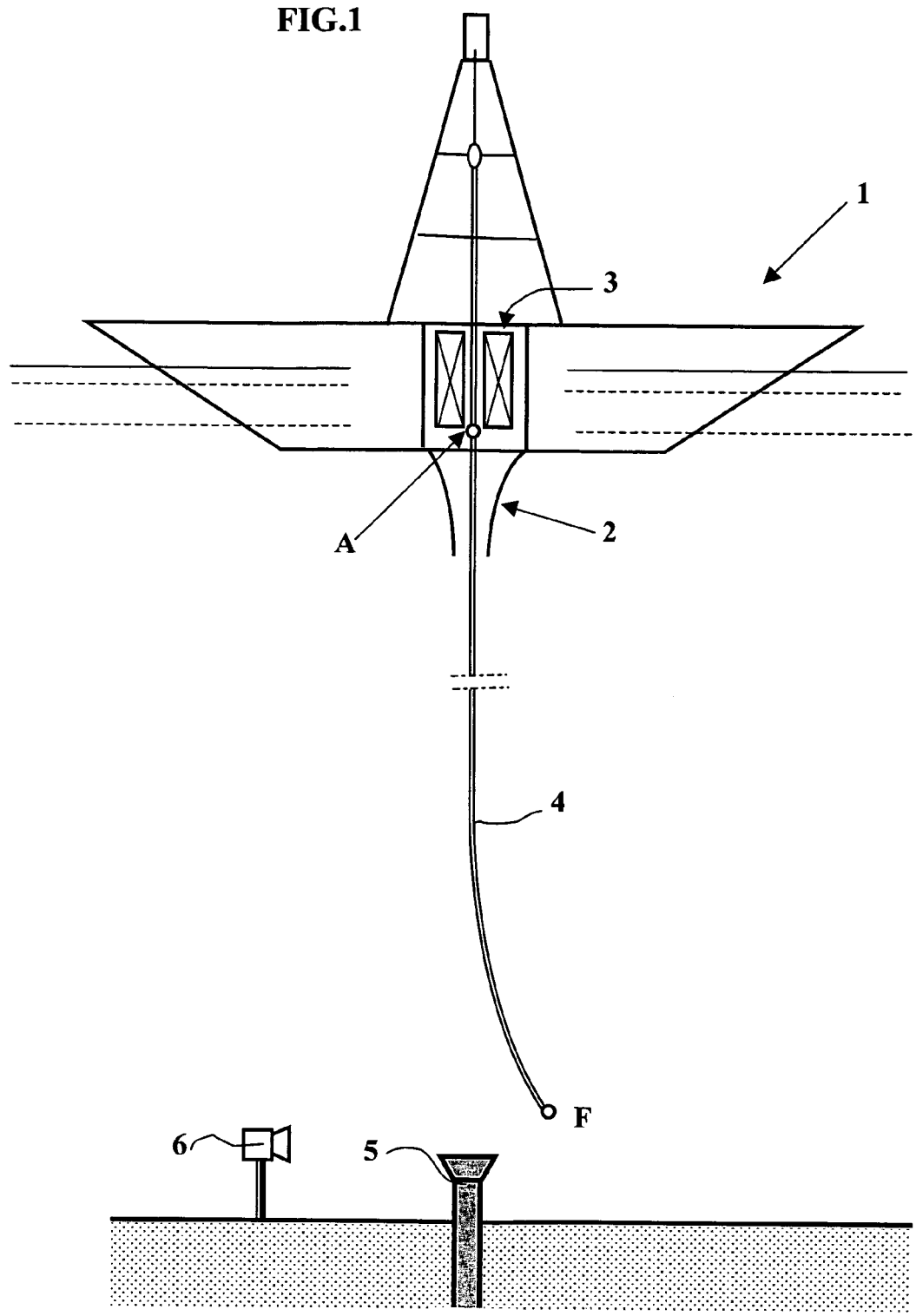
FIG. 1 shows a pipe during an operation of connection to a wellhead.

Floating vessel 1 conveys a pipe that can be wound on a reel, or come in form of sections to be assembled. Pipe 4 is unwound in the sea by either unwinding the reels or by assembling end to end the pipe sections. Upper end A or top of the pipe is kept up by floating vessel 1 and guided by ramp 2. Tensioning means 3 allow to take up the vertical stresses such as the weight at the top A of the pipe. During laying of the pipe in the sea, foot F of pipe 4 has to be connected to wellhead 5. Cameras 6 installed in the vicinity of wellhead 5 allow to observe the position of foot F in relation to wellhead 5.

Figure 2:
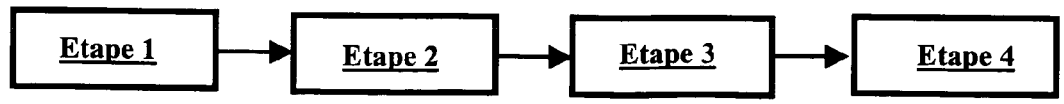
FIG. 2 diagrammatically shows the method according to the invention.

The method according to the invention is illustrated by the diagram of FIG. 2.

Stage 1: Determination of a Model

A mathematical model giving the position of lower end F of the pipe as a function of the position of upper end A is determined. The model is determined from the intrinsic characteristics of the pipe and using a beam model translating the dynamic behaviour of a pipe.

The model can take account of the following characteristics:

the geometric characteristics of the pipe, such as I the moment of inertia along the longitudinal axis of the pipe or EI the flexural rigidity, A the surface area of the pipe section or EA the axial rigidity, L the length of the pipe, D the diameter, the mechanical characteristics of the pipe, such as E the Young modulus of the pipe, R the lineic weight of the pipe, the load applied to the pipe, such as the transverse CD and longitudinal CDL drag coefficients (interaction of the water on the pipe).

The model uses the modal decomposition method which is satisfactory for description of the pipe behaviour.

According to the invention, the model is determined by carrying out successively the following operations:

Operation 1: the dynamics of the displacements along the pipe is expressed by the partial differential equations by taking account of the characteristics mentioned above.

For example, the dynamics of the deformations along the pipe in relation to its vertical equilibrium position in plane ((ox),(oz)) is expressed by the following partial differential equations (1):

$$ru_{,tt} = EAu_{,ss} + F_t$$

$$r_a w_{,tt} = r_s w_{,s} + T_e w_{,ss} + r_s s w_{,ss} + EAu_{,s} w_{,ss} + F_n.$$

wherein:

u and w represent the vertical and lateral displacements of the point of the structure associated with the curvilinear abscissa s in relation to the reference position, Fn and Ft are the normal and tangential components of the drag force, E is the Young's modulus, I is the moment of inertia along axis (oz) and A is the surface area of the section of the pipe. r is the lineic mass of the riser, rs is the lineic weight of the underwater part of the riser and ra is the mass increased by the added water mass. Te is the tension at the foot of the pipe under static conditions.

y,x=∂y/∂x is the partial derivative of y in relation to x.

Operation 2: a spatial discretization is carried out on the partial differential equations obtained in operation 1. A matrix equation expressing the dynamics of the displacement vector is obtained. The equation is expressed as a function of the mass, stiffness and possibly damping matrices. This vector consists of the displacement values at the various nodes modelling the structure.

The following spatial discretization:

$$s = (i-1)h \left( i \in [1, n]h = \frac{L}{n} \right)$$

$$(\omega_{,s})_i = \frac{\omega_{i+1} - \omega_{i-1}}{2h} + O(h^2)$$

$$(\omega_{,ss})_i = \frac{\omega_{i+1} - 2\omega_i + \omega_{i-1}}{h^2} + O(h^2)$$

$$(u_{,ss})_i = \frac{u_{i+1} - 2u_i + u_{i-1}}{h^2} + O(h^2)$$

allows to put equation (1) in the following matrix form:

$$M_v(U, W)\ddot{U} + K_v(U, W)U = F_t(\dot{U})$$

$$M_l(U, W)\ddot{W} + K_l(U, W)W = F_n(W)$$

wi (respectively ui) is the lateral displacement of the i-th node (respectively the vertical displacement of the i-th node). U and W are the displacement vectors consisting of the vertical and lateral displacements of the nodes modelling the pipe. Matrices Ml and Mv are the mass matrices, these two matrices taking account of the drag force due to acceleration by the added mass terms. Matrices Kl and Kv are the stiffness matrices.

Operation 3: from the geometric and mechanical characteristics of the pipe, the vertical and lateral natural modes associated with the pipe are determined by methods known to the man skilled in the art, for example by direct calculation or by software computation. For example, the natural modes are determined from the matrix equation obtained in operation 2: the eigenvalues and the eigenvectors associated with the product of the inverse of the mass matrix by the stiffness matrix are determined. Thus, the eigenvectors and the eigenvalues corresponding to each natural mode are determined.

According to the example, the values of matrices Kl and Kv associated with the case where the pipe is in its static position meeting the following boundary conditions:

$$w(s, t) = 0 \quad \text{at } s = L$$
$$EI\frac{\partial^2 w(s, t)}{\partial s^2} = 0 \quad \text{at } s = L$$
$$u(s, t) = 0 \quad \text{at } s = L$$

allow to determine the vertical and lateral natural modes associated with the structure by calculating the roots of the eigenvalues of the matrices: $Mv^{-1} Kv$ and $Ml^{-1} Kl$.

Operation 4: decomposition of the displacement vector (obtained in operation 2) is carried out using the natural modes associated with the pipe (determined in operation 3) in an orthogonal modal base and in the frequency domain. We obtain a displacement vector expressed in the frequency domain as a function of the modal base and of unknown coefficients.

By way of example, from here on, notations u and w are used for the eigenvalues associated with the vertical and lateral natural modes. Thus, let $(ui) \in \mathbb{N}$ be the family of the vertical eigenvalues and $(Ui) \in \mathbb{N}$ the family of the eigenvectors associated with the vertical natural modes. Let $(wi) \in \mathbb{N}$ be the family of the lateral eigenvalues and $(Wi) \in \mathbb{N}$ the family of the eigenvectors associated with the lateral modes.

We put ourselves in the context of a regular excitation imposed at the top the pipe of angular frequency $\Omega$. $\overline{U}$ is the complex vector associated with U and $\overline{W}$ the complex vector associated with W. We decompose $\overline{U}$ and $\overline{W}$ in the two bases $(Ui) \in \mathbb{N}$ and $(Wi) \in \mathbb{N}$.

$$\overline{U} = \overline{U}_{imp} + \sum_i a_i U_i e^{j\Omega t}$$

$$\overline{W} = \overline{W}_{imp} + \sum_i b_i W_i e^{j\Omega t}$$

j is the complex number defined by $j^2 = -1$.

Uimp is a vector whose components correspond to the vertical displacements imposed at each node, Wimp is a vector whose components correspond to the lateral displacements imposed at each node. These vectors correspond to mode 0, the rigid body mode. $\overline{U}_{imp}$ and $\overline{W}_{imp}$ are the two complex vectors associated with Uimp and Wimp. The two terms $$\sum_i a_i U_i e^{j\Omega t}$$

and $$f = \frac{1}{2}\rho_{water} C_d D$$

correspond to the dynamics of the natural modes of order greater than 1 expressing the deformations of the pipe in the two vertical and lateral directions.

Operation 5: the pipe is subjected to the drag force corresponding to the interaction of the water on the pipe. The drag force is a term of the matrix equation obtained in operation 2. In reality, the drag force varies quadratically with the relative velocity of the pipe in the water. According to the invention, the drag force is linearized in order to obtain a model simple to control. The force is linearized by introducing a variable which corresponds to a norm of the relative velocity of the pipe in relation to the water. This variable is unknown.

For example, this drag force is linearized by introducing a variable No which corresponds to a norm of the mean velocity of the pipe:

$$\overline{F}_n = -\frac{1}{2}\rho_{eau} C_d D No \dot{W} = \frac{1}{2}\rho_{eau} C_d D No\left(-\overline{W}_{imp} - \sum_i j\Omega b_i W_i e^{j\Omega t}\right)$$

Operation 6: the unknown coefficients of the displacement vector obtained in operation 4 are determined, the unknown coefficients being associated with the modal base. The coefficients are determined using the matrix equation (obtained in operation 2) and the orthogonality of the base in which the displacement vector is decomposed using the natural modes (see operation 4).

By denoting:

$$\sum_i b_i W_i e^{j\Omega t}$$

we find the expression of the coefficients to be determined:

$$b_i e^{j\Omega t} = \frac{-MW_i^t \ddot{\overline{W}}_{imp} - fNoW_i^t \dot{\overline{W}}_{imp}}{((-\Omega^2 + w_i^2)W_i^t MW_i + j\Omega fNoW_i^t W_i)}$$

Operation 7: the displacement vector as obtained in operations 4 or 6 is expressed using an infinite number of natural modes. According to the invention, a determined and limited number of natural modes is selected to define the displacement vector. The natural modes of higher rank are not taken into account. In fact, in the situation of an underwater pipe, they are not or not very much excited and their contribution to the model definition can be disregarded. A displacement vector expressed by a determined number of natural modes is obtained.

Operation 8: the component of the displacement vector (obtained in operation 7) corresponding to the node located at foot F of the pipe is extracted. In fact, in order to know and to control displacement of foot F of the pipe, the positions of the nodes located between top A and foot F of the pipe are not significant. We obtain an equation relating the position of foot F to the position of top A in the frequency domain.

Operation 9: the equation obtained in operation 8 is converted to a time equation (frequency-time inverse change) which translates the dynamics, for example the position, the velocity and the acceleration of foot F of the pipe as a function of the dynamics, for example the position, the velocity and the acceleration of top A.

For example by limiting ourselves to the first two modes and by changing from the frequency to the time domain, we obtain a model of order 4 translating the behaviour of foot F of the pipe as a function of the excitation at the top. We thus obtain an equation of the form as follows:

$$\left(x_F^{(4)} - x_A^{(4)}\right) + fNo\left(\frac{W_1^t W_1}{W_1^t M W_1} + \frac{W_2^t W_2}{W_2^t M W_2}\right)(x_F^{(3)} - x_A^{(3)}) +$$

$$\left(w_1^2 + w_2^2 + f^2 No^2 \frac{W_1^t W_1 W_2^t W_2}{W_1^t M W_1 W_2^t M W_2}\right)(\ddot{x}_F - \ddot{x}_A) +$$

$$fNo\left(w_2^2 \frac{W_1^t W_1}{W_1^t M W_1} + w_1^2 \frac{W_2^t W_2}{W_2^t M W_2}\right)(\dot{x}_F - \dot{x}_A) +$$

$$w_1^2 w_2^2 (x_F - x_A) = -\frac{W_1(1)}{W_1^t M W_1} W_1^t M U_u x_A^{(4)} - \frac{W_2(1)}{W_2^t M W_2} W_2^t M U_n x_n^{(4)} -$$

$$\frac{W_1(1)}{W_1^t M W_1} fNo\left(\frac{W_1^t M U_n}{W_2^t M W_2} W_2^t W_2 + W_1^t U_n\right) x_A^{(3)} -$$

$$\frac{W_2(1)}{W_2^t M W_2} fNo\left(\frac{W_2^t M U_n}{W_1^t M W_1} W_1^t W_1 + W_2^t U_n\right) x_A^{(3)} -$$

$$\frac{W_1(1)}{W_1^t M W_1}\left(No^2 f \frac{W_1^t U W_2^t W_2}{W_2^t M W_2} + w_2^2 W_1^t M U_n\right) \ddot{x}_A -$$

$$\frac{W_2(1)}{W_2^t M W_2}\left(No^2 f \frac{W_2^t U W_1^t W_1}{W_1^t M W_1} + w_1^2 W_2^t M U_u\right) \ddot{x}_A -$$

$$\frac{W_1(1)}{W_1^t M W_1} w_2^2 fNo W_1^t U_n \dot{x}_A - \frac{W_2(1)}{W_2 M W_2} w_1^2 fNo W_2^t U_n \dot{x}_A$$

Operation 10: the equation obtained in operation 9 still comprises an unknown: the norm of the mean velocity of the pipe in relation to the water. The norm of the mean velocity of the pipe in relation to the water is determined. For example, it is possible to carry out an identification between the path of the pipe foot, the path being defined by the equation obtained in operation 9, and a path measured or determined during a real or simulated experiment.

We thus obtain a numerical dynamic model relating the position XF of the lower end F of the pipe to the position XA of the upper end A: F1(XF)=F2(XA), F1 and F2 being functions expressed notably as a function of the eigenvectors, the eigenvalues, the masses and the norm of the mean velocity.

The model can be decomposed into two models:
  a first model relating the vertical position of the lower end F of the pipe to the vertical position of the upper end A,
  a second model relating the lateral position of the lower end F of the pipe to the lateral position of the upper end A (the lateral position corresponds to the position in two horizontal directions).

For example, for rigid vertical pipes, examination of the values of the natural modes associated with the vertical direction shows that mode 0 (rigid body mode) is sufficient for modelling the vertical behaviour of the pipe. In fact, the difference between the eigenvalue 0 corresponding to mode 0 and the eigenvalues corresponding to the higher modes is great. Thus, we deduce the direct relation f1(zF)=f2(zA) between zF the vertical position of the foot and zA the vertical position of the top of the pipe: zF=zA+L.

For example, for some pipes, the model translating the lateral behaviour of the foot of the pipe takes account of the first two natural modes associated with the lateral directions. The model takes account of the drag force. It is possible to linearize the drag force by introducing a variable which corresponds to a norm of the relative velocity of the pipe in relation to the water.

A model of order 4 is obtained when changing from the frequency domain to the time domain: the lateral position xF of the foot of the pipe as a function of the lateral position xA of the top of the pipe is expressed by the relation: g1(xF)=g2(xA).

In the case of a load supported by a cable, the model determined in stage 1 takes account of the weight of the load because the motion of the lower end of the cable is influenced by the hydrodynamics of the load.

Stage 2: Determination of a Reference Path

A reference path which foot F of the pipe has to follow to reach wellhead 5 is determined. The reference path is determined in such a way that foot F of the pipe reaches the target with a substantially zero velocity and acceleration to prevent damage to wellhead 5 or lower end F of the pipe. Furthermore, the path can be optimized so as to limit the power to be developed during the connection operation (stage 4) by the actuators handling the top of the pipe. The reference path can depend on the number of modes selected (see stage 1, operation 4) for the model.

It is possible to define the reference path by functions such as polynomials or trigonometric functions. The reference path can be defined by a single function, or by parts, each part being a different function. For example, for each lateral and vertical position, a path can be defined by a polynomial of order 4 by taking notably account of the position of foot F of the pipe and of the position of wellhead 5.

Stage 3: Control Laws

Control laws allowing to control the path leading foot F to wellhead 5 are determined. The control laws are designed from the model determined in stage 1 and consist in controlling the path of lower end F of the pipe in the three directions (vertical direction and the two lateral directions). These path controls are carried out by means of feedbacks on the measurements, gains, constant or not, being associated with these feedbacks.

The control laws can be determined using the flat system theory: planning of the reference path and control of the real path use the flatness of controllable linear systems. Using the flat system theory allows to obtain a robust control system because the feedbacks can be carried out on the position, the velocity and the acceleration, and also on the derivatives of the position of order greater than 2.

The flat system theory and application examples are notably described in the following documents:

M. Fliess, J. Lévine, Ph. Martin, P. Rouchon. Sur les systèmes non linéaires différentiellement plats. C.R. Acad. Sci. Paris, I-315 (619–624), 1992.

L. Bitauld, M. Fliess, J. Lévine. A flatness based control synthesis of linear systems and application to windshield wipers. Proceedings of the ECC'97, Paper No. 628. Brussels, 1997.

J. Lévine, D. V. Nguyen. Flat output characterization for linear systems using polynomial matrices. Systems & Control Letters 48 69–75, 2003.

P. Martin, P. Rouchon. Systèmes plats: planification et suivi de trajectoires. Journées X-UPS, 1999.

M. Fliess, J. Lévine, Ph. Martin, P. Rouchon. A Lie-Bäcklund approach to equivalence and flatness of non-linear systems. IEEE Trans. Automat. Control 44 (5) (1999) 1327–1361.

M. Fliess, J. Lévine, Ph. Martin, P. Rouchon. Flatness and defect of nonlinear systems: Introductory theory and applications. Internat. J. Control 61 (1995) 1327–1361.

It is also possible to determine control laws using PIDs (Proportional Integrator Derivators).

The control laws express the new position at the top of the pipe as a function of the previous positions at the top, at the foot, and the gains. The control laws can also take account of the derivatives of the positions at the top and at the foot of the pipe. These derivatives can be estimated from the values of the previous positions of the top and the foot of the pipe.

The gains associated with the static feedbacks are determined so as to improve the control law dynamics, i.e. to rapidly reach the reference path in order to limit the oscillations of the real path in relation to the reference path and/or to reduce or to cancel the error, i.e. the difference between the real path and the reference path.

Stage 4: Connection Operation

Determined motions are applied to the top A of the pipe so that the position of foot F follows as closely as possible the reference path determined in stage 3.

The motions applied to top A of the pipe are determined by means of the control laws determined in stage 3, by taking notably into account:

the position of top A of the pipe,
the position of foot F of the pipe,
the reference path selected in stage 2.

Actuators arranged on floating vessel 1 allow to apply the motions to top A of the pipe. The type of motions that can be applied by the actuators to the pipe is conditioned by the technique by means of which top A of the pipe is supported by floating vessel 1.

The position of top A of the pipe can be determined by various means, for example by a GPS type system, by direct measurements on floating vessel 1 and by measuring the wave motion.

If the position of top A of the pipe is determined by means of the wave motion, the wave motion can be measured for a given time period preceding the connection stage.

The wave motion and the wind acting on floating vessel 1 apply a motion to upper end A of the pipe. These motions, generated by the wave motion, can be cyclic or not depending on whether the wave motion is regular or irregular.

The motion undergone by top A of the pipe is measured for a predetermined period preceding the beginning of stage 4 (connection operation). This motion can be obtained directly by measuring the motion of a point of floating vessel 1. The motion of the top of the pipe can also be determined from measurement of the motion of a buoy undergoing the wave motion.

During the connection operation, the motions of floating vessel 1 during connection are assumed to be substantially identical to the motions previously measured during the predetermined period.

The position of foot F of the pipe can be measured by cameras 6. At least two cameras are necessary to determine the position of the foot in the three directions (vertical direction and the two lateral directions).

What is claimed is:

1. An automatic control method for positioning the lower end of an underwater filiform structure in relation to a target located in the water, wherein the following stages are carried out:

a) holding up the upper end of the filiform structure by means of a floating vessel, the lower end of the filiform structure being free, b) determining a mathematical model expressing the position of the lower end as a function of the position of the upper end, the mathematical model being determined from characteristics intrinsic to the filiform structure using a beam model translating the dynamic behaviour of the filiform structure and using a modal decomposition method, c) determining a reference path for the lower end, which leads to the target, d) from the mathematical model determined in stage b), determining control laws allowing displacement of the lower end of the filiform structure, e) applying motions to the upper end so that the position of the lower end follows as closely as possible the reference path determined in stage c), said motions being determined using the control laws determined in stage d), by taking account of the reference path determined in stage c) and by taking account of the positions of the lower and upper ends of the filiform structure.

2. A method as claimed in claim 1 wherein, in stage b), a mathematical model is determined by carrying out the following operations:

operation 1: expressing the displacement dynamics of the filiform structure by partial differential equations, operation 2: carrying out spatial discretization on the partial differential equations obtained in operation 1 to obtain a matrix equation translating the displacement vector dynamics, operation 3: from the intrinsic characteristics of the filiform structure, determining the vertical and lateral natural modes associated with the filiform structure, operation 4: carrying out decomposition of the displacement vector obtained in operation 2 using the natural modes determined in operation 3 in an orthogonal modal base and in the frequency domain to obtain a displacement vector expressed in the frequency domain as a function of the modal base and of coefficients, operation 5: linearizing the drag force by introducing a variable which corresponds to a norm of the relative velocity of the pipe in relation to the water, operation 6: determining the coefficients of the displacement vector obtained in operation 4 using the matrix equation obtained in operation 2 and the orthogonality of said base, operation 7: selecting a determined and limited number of natural modes to define the displacement vector, operation 8: extracting the component of the displacement vector obtained in operation 7 corresponding to the node located at the lower end of the filiform structure to obtain an equation relating the position of the lower end to the position of the upper end in the frequency domain, operation 9: converting the equation obtained in operation 8 to a time equation, operation 10: determining said variable by identification.

3. A method as claimed in claim 1 wherein, in stage c), the reference path is expressed by a polynomial function.

4. A method as claimed in claim 1 wherein, in stage c), the reference path is determined so that the lower end of the filiform structure reaches the target with a zero velocity.

5. A method as claimed in claim 1 wherein, in stage d), the control laws are determined from the flat system theory.

6. A method as claimed in claim 1 wherein, in stage d), the control laws are determined using PID type controls.

7. A method as claimed in claim 1 wherein, in stage e), the position of the lower end of the filiform structure is determined by visual display of the lower end.

8. A method as claimed in claim 1 wherein, in stage e), the position of the upper end of the filiform structure is determined by measuring the displacement of the floating vessel.

9. A method as claimed in claim 1, wherein the motion undergone by the upper end of the filiform structure is measured for a period of time preceding stage e) and, in stage e), the motion of the upper end of the pipe is assumed to be identical to the previously measured motion.

10. A method as claimed in claim 1, wherein the filiform structure is a flowline, production riser or drilling riser type pipe and wherein the target is a subsea wellhead.

11. A method as claimed in claim 1, wherein the filiform structure is an umbilical or a cable and wherein the target is a baseplate resting on the sea bottom.

12. A method as claimed in claim 1, wherein the filiform structure is a cable whose lower end supports a load.

\* \* \* \* \*